C. A. WINSHIP.
Sewer Trap.
No. 201,899. Patented April 2, 1878.
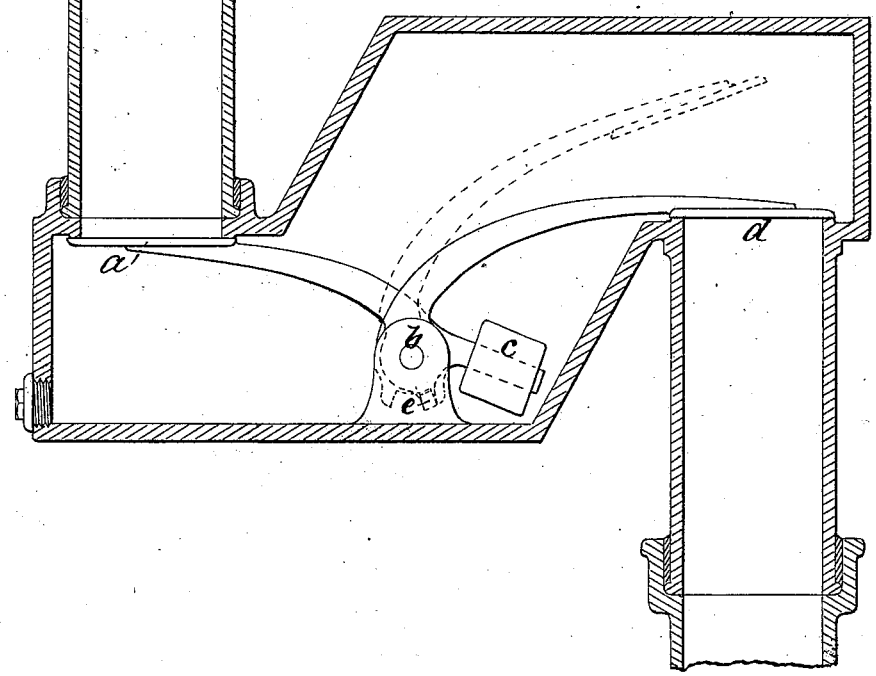
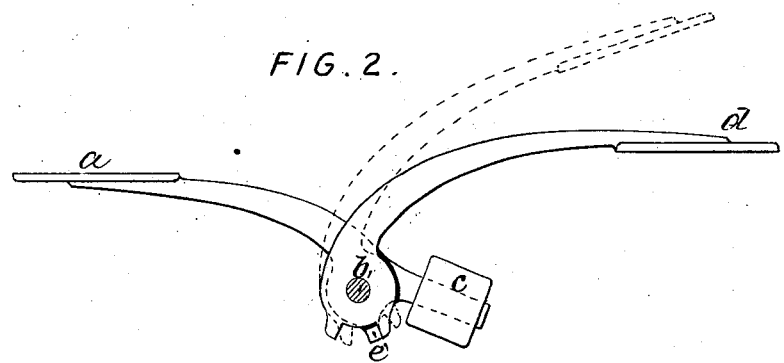
WITNESSES.
Chas. A. Winship
INVENTOR.

UNITED STATES PATENT OFFICE.

CHARLES A. WINSHIP, OF BROOKLYN, NEW YORK.

IMPROVEMENT IN SEWER-TRAPS.

Specification forming part of Letters Patent No. 201,899, dated April 2, 1878; application filed February 26, 1878.

*To all whom it may concern:*

Be it known that I, CHARLES A. WINSHIP, of Brooklyn, in the county of Kings and State of New York, have invented a certain new and useful Improvement in Sewer-Traps, of which the following is a specification:

The said improvement relates to traps for sewer and other discharge pipes, to prevent the passage of gas and vapor through the pipes from the sewer; and it consists in fitting the two openings of the trap with valves that will be readily opened by the downward flow of the discharging fluid, and both of which will be closed to the rise of vapor. If there should be a backward pressure from the sewer of sufficient force to raise and open the discharge-valve from the trap, the increased pressure in the trap will but more forcibly close the inlet-valve with a corresponding degree of pressure to prevent the entrance from below of either fluid or gas into the pipe leading upward from the trap. The outlet-valve can only be opened by the opening of the inlet-valve to permit the downward passage of fluid, except in the case of undue pressure from the sewer, and any suction from the sewer which would empty an ordinary trap of its sealing-fluid by siphonage and permit the escape of gas from the sewer would but close it the tighter.

To enable others skilled in the arts to which it appertains to make and use my invention, I will proceed to describe its construction and operation with reference to the drawings.

Figure 1 is a longitudinal section of a sewer-trap made according to my said invention; and Fig. 2 is a separate view of a method of connecting the valves at the axis on which they work, so that the opening of the inlet-valve also opens the outlet, while permitting the latter to open alone without also opening the former.

The inlet-valve $a$ turns on the axis $b$, and is held closed by the weight $c$. The outlet-valve $d$ also turns on the same axis $b$, and is held closed by its own weight.

A projecting nipple, $e$, on the hub of the inlet-valve works in a slot in the hub of the outlet-valve so that the downward flow of fluid that opens the inlet also opens the outlet; but an upward pressure from the sewer that would lift the outlet-valve would turn it on the axis without affecting the other valve, which, on the contrary, would be held the tighter by the increased pressure in the trap. The same end would be effected by a chain or other flexible connection between the arms that carry the valve, by which the opening of the inlet would also open the outlet; but the opening of the outlet from below would only let the chain down without opening the other valve.

The valves may be closed by springs, and the counterbalance-weight of the inlet-valve may be replaced by a spring.

The valves or their seats may be fitted with washers to close the joints more perfectly, and the other details of construction may be made as may be required.

I claim as my invention—

The combination, in a sewer-trap, of the inlet-valve $a$ and the outlet-valve $d$, connected to be opened together by a downward flow, and one at least to remain closed to an upward pressure or to suction, substantially as described.

CHAS. A. WINSHIP.

Witnesses:
 P. H. VERNON,
 WM. KEMBLE HALL.